United States Patent [19]

Struger et al.

[11] 4,118,792

[45] Oct. 3, 1978

[54] MALFUNCTION DETECTION SYSTEM FOR A MICROPROCESSOR BASED PROGRAMMABLE CONTROLLER

[75] Inventors: Odo J. Struger, Chagrin Falls; Timothy E. McAdams, Willowick; Ernst Dummermuth, Chesterland, all of Ohio

[73] Assignee: Allen-Bradley Company, Milwaukee, Wis.

[21] Appl. No.: 790,590

[22] Filed: Apr. 25, 1977

[51] Int. Cl.[2] .......................... G06F 9/06; G06F 11/00
[52] U.S. Cl. .................................. 364/900; 364/104; 364/119; 235/304
[58] Field of Search ... 364/900 MS File, 200 MS File, 364/104, 119, 304

[56] References Cited

U.S. PATENT DOCUMENTS

| | | | |
|---|---|---|---|
| 3,719,931 | 3/1973 | Schroeder | 364/900 |
| 3,829,842 | 8/1974 | Langdon et al. | 364/900 |
| 3,944,984 | 3/1976 | Morley et al. | 364/900 |
| 3,997,879 | 12/1976 | Markley et al. | 364/900 |

OTHER PUBLICATIONS

Andreiev, "Programmable Logic Controllers" in Control Engineering, Sep. 1972, pp. 45-47.
Symmes, "Programmable Controllers and Computers Complement Each Other for More Effective Industrial Control" in Computer Design, Sep. 1973, pp. 54, 56, 58, 60.
Kompass, "Multiprocessor Concept Leads to PLC Hierarchies" in Control Engineering, Jan. 1976, pp. 46-47.

Primary Examiner—Melvin B. Chapnick
Attorney, Agent, or Firm—Quarles & Brady

[57] ABSTRACT

Fault detection hardware is employed at the I/O interface racks of a programmable controller to detect fault conditions which may occur there. An I/O fault line is connected in daisy chain fashion between the I/O interface racks and the controller processor, and when a fault is indicated at any of the I/O interface racks, it is communicated to the controller processor through this line. The indicated I/O fault freezes, or holds, a microprocessor in the controller processor, and if the I/O fault persists for a preselected time interval, all operating devices connected to the programmable controller interface racks are decontrolled. A watchdog timer is also provided in the controller processor for detecting malfunction conditions which may occur at the processor. When such a condition is detected, the operating devices connected to the programmable controller interface racks are decontrolled.

8 Claims, 5 Drawing Figures

MALFUNCTION DETECTION SYSTEM FOR A MICROPROCESSOR BASED PROGRAMMABLE CONTROLLER

BACKGROUND OF THE INVENTION

The field of the invention is programmable controllers and more particularly, means for monitoring the various elements thereof to detect and indicate any malfunctions which may occur while the system is operating.

As disclosed in copending U.S. patent application Ser. No. 779,916 entitled "Malfunction Detection System for a Programmable Controller," numerous means are known in the art for the on line detection and indication of malfunctions in relatively small hardwired programmable controllers. Also, elaborate means for accomplishing the same functions in relatively large programmable controllers are well known as disclosed in U.S. Pat. No. 3,997,879 entitled "Fault Processor for Programmable Controller with Remote I/O Interface Racks." Filed on even date herewith is U.S. patent application Ser. No. 790,251 entitled "Programmable Controller with Integral Microprocessor" which discloses a new programmable controller architecture. This programmable controller employs both a microprocessor and a hardwired Boolean processor to control operating devices which connect to the circuits in one or more I/O interface racks. This new architecture requires unique means for monitoring the operation of its elements.

SUMMARY OF THE INVENTION

The present invention relates to a system for detecting and indicating faults in a programmable controller, and more particularly, to a programmable controller which employs a plurality of I/O interface racks to connect the controller processor to the machine being controlled. An I/O fault line connects between I/O interface racks and to the controller processor. Each I/O interface rack includes fault detection hardware and the output of this hardware is coupled to the I/O fault line through a logic gate. When the logic state of the I/O fault line changes, a fault is indicated in one or more of the I/O interface racks or an open connection has occurred in the I/O fault line.

Another aspect of the invention is the manner in which the controller processor responds to an indicated malfunction on the I/O fault line. The fault indicating logic state is coupled to a timer and if the indicated fault persists for more than a preselected time interval, a logic signal is generated on an I/O reset line which couples to each of the I/O interface racks. This generated logic signal is applied to the output circuits in each I/O interface rack to effectively decontrol the operating devices connected thereto. In addition, the controller processor is inhibited from executing any further controller instructions so that data is neither coupled to or from the affected I/O interface rack.

Yet another aspect of the invention is the means employed to detect and respond to malfunctions which may occur within the controller processor. A watchdog timer has its input coupled to sense the occurrence to an event within the controller processor, which event occurs periodically when the controller processor is operating properly. The output of the watchdog timer couples to the I/O reset line and if the event does not occur as expected, the watchdog timer "times out" and generates the logic signal on the I/O reset line which decontrols all operating devices. In the preferred embodiment described herein, the periodic event is the execution of an I/O scan routine which couples data to and from the I/O interface racks.

A general object of the invention is to provide an effective means for monitoring the operation of various elements in a programmable controller.

Another object of the invention is to minimize the amount and the complexity of the hardware required to effectively monitor the operation of a programmable controller.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
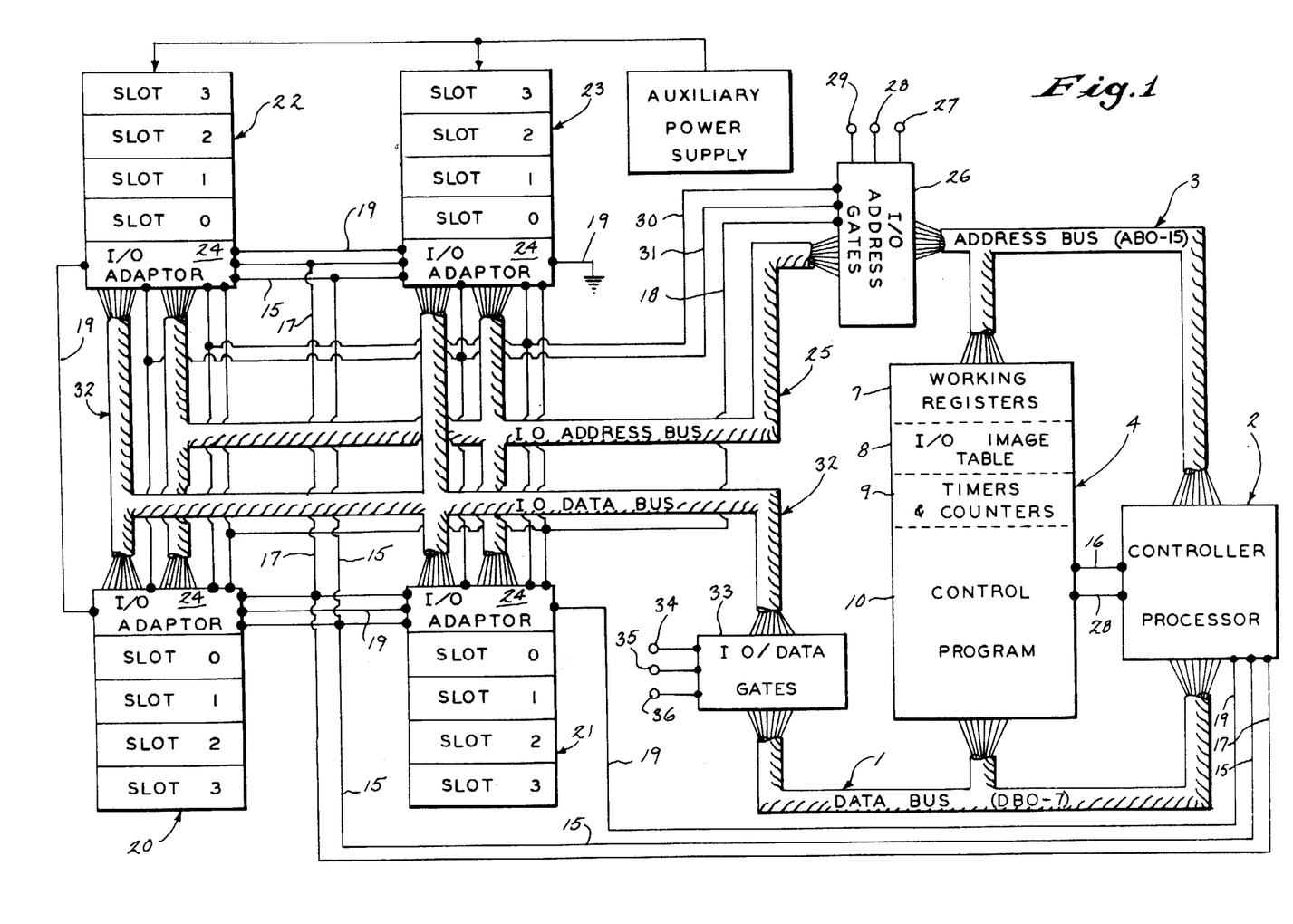
FIG. 1 is a block diagram of the programmable controller which employs the present invention.

Referring to FIG. 1, the programmable controller is structured around an eight-bit bidirectional data bus 1 and includes a controller processor 2 which directs the flow of data thereon by means of control lines and a sixteen-bit address bus 3. A random access memory (RAM) 4 connects to both the data bus 1 and the address bus 3 and an eight-bit data word may be written into an addressed line or read out of an addressed line of the memory 4 in response to control signals applied to "data out strobe" and "MEMR" control lines 16 and 28. The RAM 4 may include anywhere from 2K to 8K lines of memory depending on the size of the control program to be stored. The first 256 lines consist of working registers 7, and I/O image table 8 and a timers and counters storage 9. The remainder of the RAM 4 stores the control program 10 which is comprised of a large number of programmable controller type instructions.

The programmable controller is connected to the machine, or system being controlled, through I/O interface racks 20–23. Each interface rack 20–23 includes an I/O adaptor card 24 and up to eight eight-bit input or output cards (not shown in the drawings) that are received in four slots 0–3. That is, each slot 0–3 may include two eight-bit I/O modules, or cards—a low and a high. Each input card contains eight input circuits for receiving digital signals that indicate the status of sensing devices such as limit switches on the machine being controlled, and each output card contains eight output circuits for controlling operating devices on the machine such as motor starters and solenoids. Input and output circuits illustrated in respective U.S. Pat. Nos. 3,643,115, and 3,745,546 may be employed for this purpose although numerous circuits are available to interface with the many types of sensing devices and operating devices which may be encountered in industrial application.

Data is coupled to or from a particular card in one of the I/O interface racks 20-23 by addressing it through a five-bit I/O address bus 25. Two bits select the appropriate I/O interface rack 20-23 and the remaining three bits identify the card being addressed. The I/O adaptor card 24 on each I/O interface rack 20-23 includes means for recognizing when its rack is being addressed and it includes a three-bit decoder for enabling the appropriate slot and card. A more detailed description of the I/O adapter circuit will be provided hereinafter with reference to FIG. 4.

The I/O address is generated on the address bus 3 (AB0-AB4) by the controller processor 2. It is coupled to the I/O address bus 25 by a set of I/O address gates 26 which are enabled when a logic high voltage is generated on an "I/O SEL" control line 27. In addition to the I/O address, the gates 26 couple a "MEMR" control line 28 and a "WO" control line 29 to each of the interface racks 20-23 through a read line 30 and a write line 31. A strobe line 18 also connects to each rack 20-23 to indicate when valid data is present on the I/O address bus 25.

Data is coupled between the controller processor 2 and the I/O interface racks 20-23 through an eight-bit I/O data bus 32 and a set of eight I/O data gates 33. When a logic high voltage is generated on the read line 30, eight bits of data are gated onto the I/O data bus 32 by the addressed I/O card and is coupled to the data bus 1 by the I/O data gates 33. Conversely, when a logic high is generated on the write control line 31, an eight-bit output data word is coupled from the controller processor 2, through the I/O data gates 33 and to an addressed output card in one of the I/O interface racks 20-23. The I/O data gates 33 are controlled by a "BE" control line 34 which is driven to a logic high voltage when data is to be outputted to the I/O interface racks 20-23, and a "RLE" control line 35 which is driven high when input data is to be received from an addressed I/O card. A "CL" control line 36 synchronizes the operation of the I/O data gates 33 with that of the controller processor 2.

As will be explained in more detail hereinafter, the control program stored in the RAM 4 is repeatedly executed, or scanned, by the controller processor 2 when in the "run" mode. Each scan through the control program requires less than twenty milliseconds (the exact time depends on the length of the control program 10 and the types of instructions contained therein) and after each such scan, an I/O scan routine is executed to couple data between the I/O interface racks 20-23 and the I/O image table 8 in the RAM 4. The I/O image table stores an input status data word and an output status data word for each I/O card in the interface racks 20-23. Each data word in the I/O image table is thus associated with a specific card in one of the I/O interface racks 20-23. Each input status word is an image of the state of eight sensing devices connected to its associated I/O card and each output status word is an image of the desired state of any operating devices connected to its associated I/O card. If a particular I/O slot contains an input card, the output status word in the I/O image table 8 which corresponds to that slot is meaningless and would be blank.

The I/O scan is made after each scan, or execution, of the control program 10. The I/O scan is a programmed sequence in which output status words are sequentially coupled from the I/O image table 8 to their associated I/O cards and input status words are sequentially coupled from the I/O cards to their associated memory locations in the I/O image table 8. The I/O scan is performed every 20 milliseconds or less and thus the I/O image table 8 is kept up to date with changing conditions on the machine or process being controlled. The controller processor 2 operates on data in the I/O image table 8 rather than data received directly from the I/O interface racks 20-23. This allows the processor to operate at maximum speed to execute the control program 10 in a minimum amount of time while at the same time minimizing the data rates in the I/O data bus 32 and the I/O address bus 25. The latter consideration is important since lower data rates allow the use of more effective noise immunity circuits which are so necessary in an industrial environment.

In addition to the control lines and buses which serve to couple I/O data between the I/O racks 20-23 and the controller processor 2, an I/O fault line 19, a parity line 15 and an I/O reset line 17 interconnect these elements. The I/O fault line 19 is connected in "daisy chain" fashion between the I/O interface racks 20-23 and it has one of its ends connected to signal ground and its other end connected to the controller processor 2. The parity line 15 and the I/O reset line 17 connect directly between each of the I/O interface racks 20-23 and the controller processor 2. As will be described in more detail hereinafter, if a fault condition occurs in any of the I/O interface racks 20-23, the I/O fault line 19 rises to a logic high voltage. The controller processor 2 responds to this indicated fault by generating a logic low voltage on the I/O reset line 17. The I/O reset line 17 connects to each output circuit in the I/O interface racks 20-23, and when it goes low, these output circuits are "decontrolled" to either de-energize the operating devices which they drive, or to decouple the operating devices from the programmable controller. The controller processor 2 includes a parity generator (not shown in the drawings) which drives the parity line 15.

Figure 2:
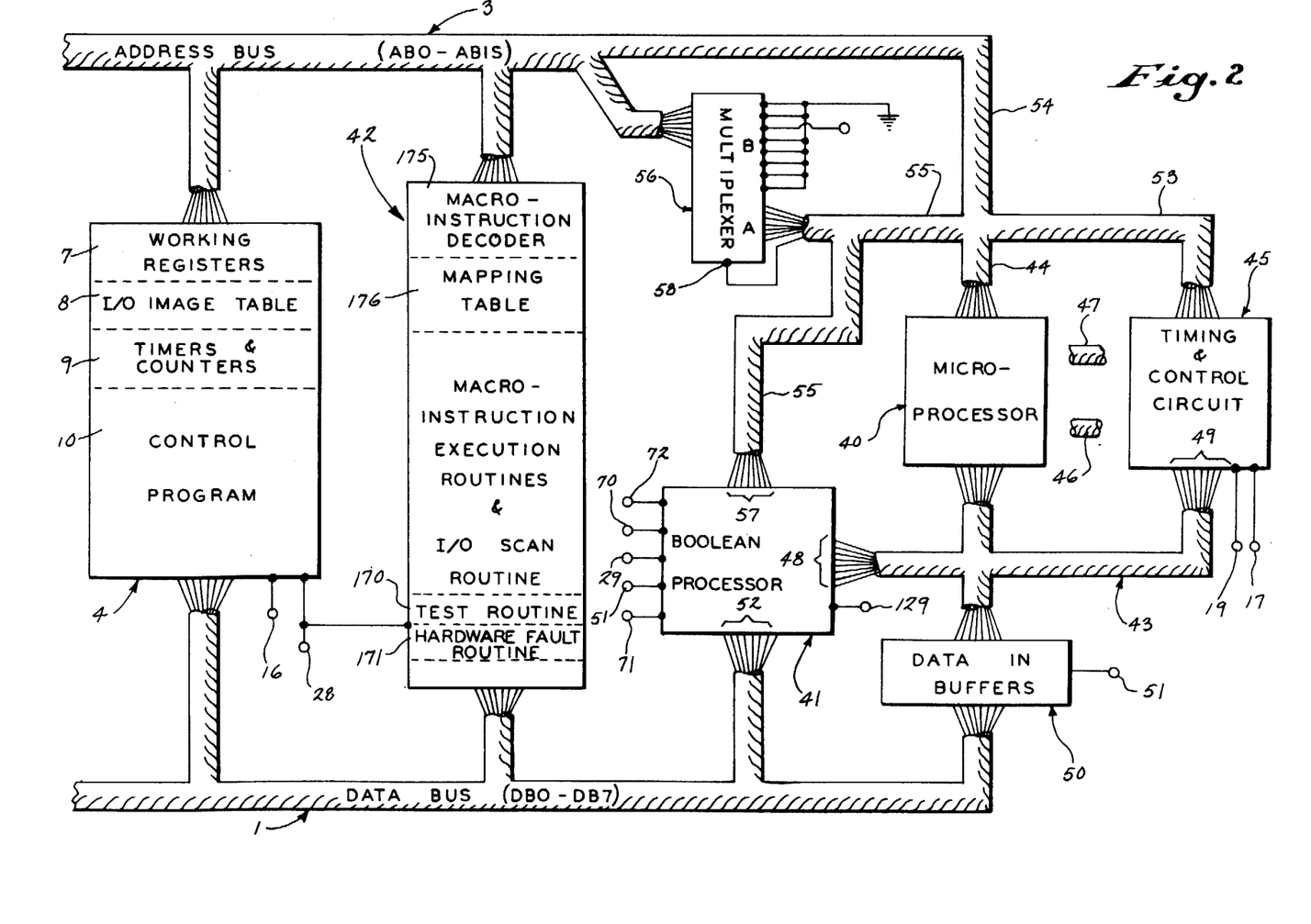
FIG. 2 is a block diagram of the controller processor which forms part of the programmable controller of FIG. 1, FIGS. 3A and 3B are electrical schematic diagrams of the timing and control circuit which forms part of the controller processor of FIG. 2.

Referring particularly to FIG. 2, the controller processor 2 is comprised of a programmed microprocessor 40, a hardwired Boolean processor 41 and supporting circuitry. The programs for the microprocessor are stored in a read-only memory (ROM) 42 which stores up to eight thousand machine instructions. The microprocessor 40 is an eight-bit, 72 instruction, LSI chip manufactured by the Intel Corporation and sold as the Model 8080. Numerous types of microprocessors are available and reference is made to the publication "Intel 8080 Microcomputer Systems User's Manual," dated September, 1975 for a complete description of the structure, operation and instruction set of the microprocessor 40 employed in the preferred embodiment of the present invention. The Boolean processor 41 is a special purpose hardwired circuit which is disclosed in detail in copending U.S. patent application Ser. No. 790,251 filed on even date herewith and entitled "Programmable Controller with Integral Microprocessor."

The microprocessor 40 transfers data and internal state information on an eight-bit bidirectional, three-state processor data bus 43 (D0-D7). The memories 4 and 42, and the I/O interface racks 20-23 are addressed by the microprocessor 40 through a 16-bit, three-state processor address bus 44. Three timing and control outputs (WR, SYNC and DBIN) emanate from the microprocessor 40 and connect with a timing and control circuit 45 through a bus 46. Four control inputs (READY, RESET, $\phi 1$ and $\phi 2$) connect the timing and control circuit 45 to the microprocessor 40 through a bus 47.

The processor data bus 43 connects to a set of eight inputs 48 on the Boolean processor 41, to eight inputs 49 on the timing and control circuit 45 and to the outputs of eight data in buffer gates 50. The inputs of the data in buffer gates 50 connect to the respective leads DB0-DB7 in the data bus 1 and data is gated from the bus 1 to the microprocessor 40 when a logic high voltage is applied to a "DBIN" control line 51. All data outputted by the microprocessor 40, except for that applied to the timing and control circuit 45, is coupled through the Boolean processor 41 and applied thereby to the data bus 1 at a set of terminals 52.

The processor address bus 44 divides to form a number of branches which connect to programmable controller system elements. A branch 53 formed by leads AB1, AB2, AB13, AB14 and AB15 connects to the timing and control circuit 45, a branch 54 formed by leads AB0-AB7 connects directly to the corresponding leads in the address bus 3, and a third branch 55 formed by leads AB8-AB15 connects to the A inputs on a multiplexer 56 and the inputs 57 on the Boolean processor 41. The lead AB15 in the branch 55 connects to a select terminal 58 on the multiplexer 56, and depending on its logic state, either the leads in the branch 55 are coupled to the leads AB8-AB15 in the address bus 3 or a constant which is applied to the B inputs on the multiplexer 56 is coupled to the address bus 3.

The constant imposed through the multiplexer 56 generates the address $8192_{10}$ (hereinafter referred to as 8K) which is that of the first line in the RAM 4. When this constant is imposed on the address bus 3, the address on the lowest eight bits AB0-AB7 which emanate directly from the microprocessor 40 selects one of the first 256 lines in the RAM 4. These lines store the working registers 7, the I/O image table 8 and the timers and counters 9 which are associated with the execution of programmable controller type instructions. As a consequence, when data is to be written into or read from the first 256 lines of the RAM 4, the processor address bus leads AB8-AB14 are free to convey control information through the branch 55 to the Boolean processor 41. This information indicates in part the type of programmable controller function which is to be performed by the Boolean processor 41 and it indicates which, if any, bit on the data bus 1 is involved in that function. When a status bit in the I/O image table 8 is to be examined, for example, the address of the memory line which stores that bit is generated on address bus lines AB0-AB7 along with the 8K constant on address bus lines AB8-AB15. Simultaneously, a bit pointer code is coupled to the Boolean processor 41 through the branch 55 to identify which bit on the addressed memory line is to be examined.

Figure 3A:
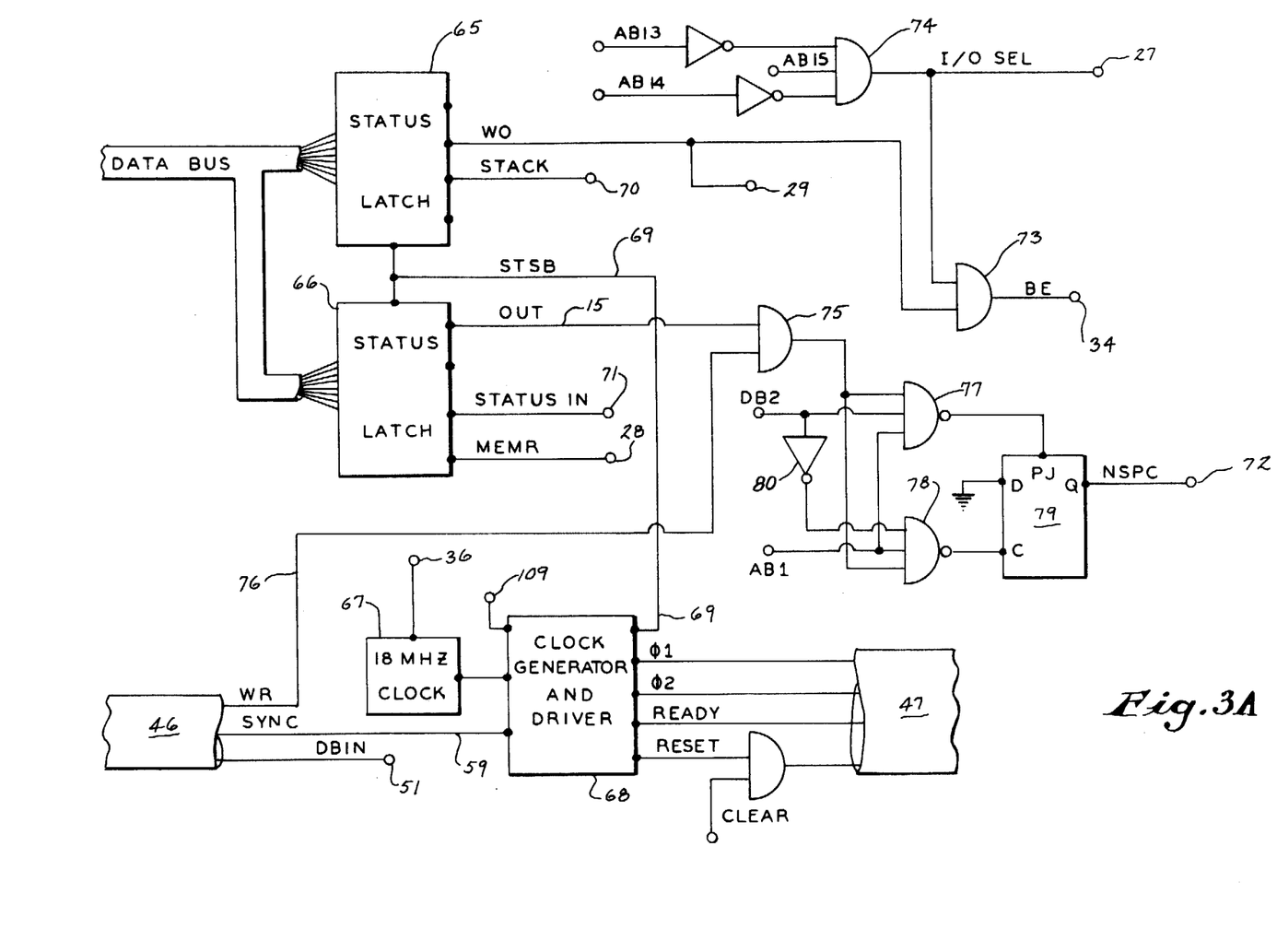
Figure 3B:
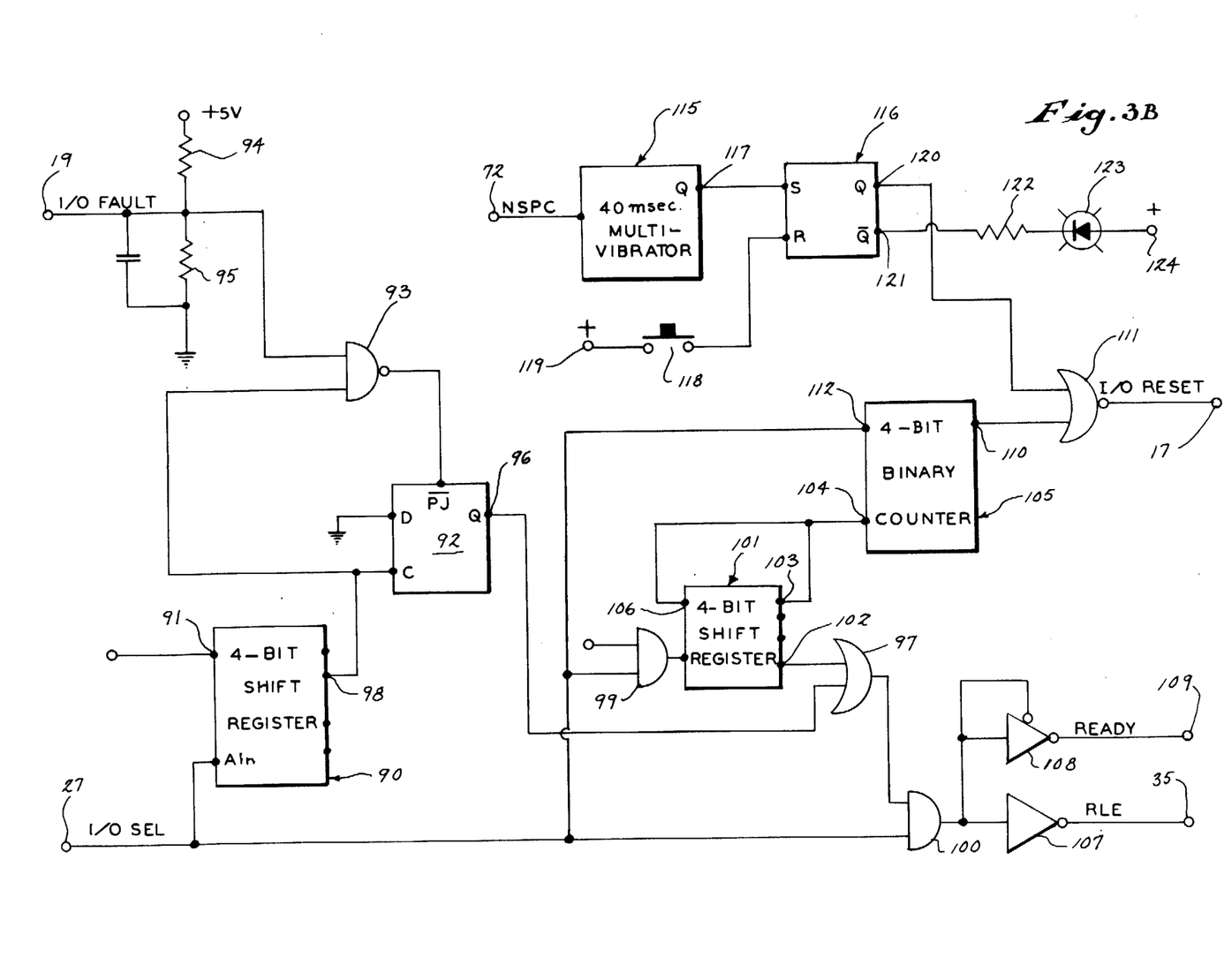

Referring particularly to FIGS. 2 and 3, the microprocessor 40 controls the various elements of the controller processor 2 and it in turn is controlled by instructions stored in the ROM 42. The microprocessor sequentially fetches such instructions from the ROM 42, stores each in its internal instruction register, and executes it. Each instruction requires from one to five machine cycles and each machine cycle consists of from three to five states. At least one machine cycle is required to fetch an instruction from the ROM 42 and the remaining portion of the instruction cycle is employed to execute the instruction. Some instructions require only a fetch machine cycle while others require additional cycles to read data from the RAM 4, write data into the RAM 4 or receive or transmit data to an I/O device. At the beginning (during the first state) of each machine cycle the microprocessor generates a SYNC control signal to the timing and control circuit 45 through the bus 46. Concurrently, the microprocessor generates a status word on the processor data bus 43 which identifies the nature of the machine cycle in progress. This status word is saved in latches 65 and 66 in the timing and control circuit 45 and is used thereby to develop the control signals which operate the various elements of the controller.

Referring particularly to FIG. 3A, the timing and control circuit 45 includes an 18 megahertz clock 67 which connects to the clock input of a clock generator and driver circuit 68 and to the CL control line 36 which operates the I/O data gates 33. The clock generator and driver circuit 68 generates two nonoverlapping clock pulse trains $\phi 1$ and $\phi 2$ which are coupled to the microprocessor 40 through the bus 47. The microprocessor 40 generates its sync signal through the sync control line 59 to the clock generator 68 at the beginning of each machine cycle and the circuit 68 in turn generates a logic high voltage on an "STSB" control line 69 to the enable terminals on the status latches 65 and 66.

A number of control signals are derived directly from the status word stored in the latches 65 and 66. These include the WO control signal on the control line 29 which indicates that data is to be outputted to an I/O interface rack 20-23, and the MEMR control signal on the line 28 which indicates that data is to be inputted from an I/O interface rack 20-23 or read from one of the controller memories 4 or 42. Two additional control signals for the Boolean processor 41 are generated directly from the status word in the latches 65 and 66. These include a "STACK" signal generated on a control line 70 and a "STATUS IN" signal generated on a control line 71. These control signals are present for the entire machine cycle, or in other words, until a new status word is generated by the microprocessor 40 at the beginning of the next machine cycle.

A number of control signals are derived indirectly from the control signals generated by the status latches 65 and 66. These include the BE signal on the control line 34 which indicates that data is to be outputted to an I/O interface rack 20-23 through the I/O data gates 33 and an "NSPC" control signal which is applied to the Boolean processor 41 through a control line 72. More specifically, the BE signal is derived from an AND gate 73 which has one input connected to the WO control line 29 and a second input connected to the I/O SEL control line 27. The I/O SEL control signal is in turn derived from an AND gate 74 which receives bit 15 in the address bus 3 and the inversion of bits 13 and 14 in the address bus 3. The I/O SEL control line 27 is driven high when an I/O interface rack 20-23 is to be addressed for the purpose of coupling data to it or receiving data from it. The BE control signal, therefore, indicates that data is to be outputted to the addressed I/O interface rack 20-23. The NSPC signal is derived from a circuit which comprises an AND gate 75, a pair of NAND gates 77 and 78 and a D-type flip-flop 79. One input of the AND gate 75 connects to an OUT line 15 on the status latch 66 and its other input connects to a "WR" control line 76 which connects to the microprocessor 40 through the bus 46. Each NAND gate 77 and 78 connects to the output of AND gate 75 and a second input on each connects to bit one in the address bus 3. Bit two in the data bus 1 connects to a third input on the NAND gate 77 and to a third input on the NAND gate 78 through an inverter gate 80. The NSPC control line 72 connects to the Boolean processor 41 and its general function is to enable the processor 41 to decode data on the processor data bus 43 and address bus branch 55 when the data is intended for the Boolean processor 41. It changes state each time an I/O scan is made, or in other words, at least once every 20 milliseconds.

Referring particularly to FIGS. 3A and 3B, the I/O SEL line 27 connects to the A input of a four-bit shift register 90. A clock input 91 on the shift register 90 connects to a source of 2 microsecond clock pulses and a third output 98 on the shift register 90 connects to the C input of a D-type flip-flop 92 and to one input of a NAND gate 93. A second input on the NAND gate 93 connects to the I/O fault line 19 and a voltage divider comprised of resistors 94 and 95 connect to it as well. The output of the NAND gate 93 connects to a $\overline{PJ}$ terminal on the flip-flop 92 and its Q output 96 connects to one input of an OR gate 97.

When the I/O SEL line 27 goes high to indicate that data is to be outputted to or inputted from an I/O interface rack 20-23, the 4-bit shift register 90 is clocked to enter a "one" in the first stage thereof. The "one" is shifted by subsequent clock pulses applied to clock terminal 91, and 6-microseconds after the I/O SEL line goes high the third output 98 goes high for a period of two microseconds. The leading edge of this 2 microsecond pulse at the output 98 clocks the D-type flip-flop 92 to drive its Q output 96 to a logic low voltage. The same two microsecond pulse enables the NAND gate 93 and if the I/O fault line 19 rises to a logic high voltage during this two-microsecond time period, the D-type flip-flop 92 is reset through its $\overline{PJ}$ terminal to drive its Q output to a logic high voltage. In other words, if an I/O fault has occurred it is indicated on the line 19 and is stored in the flip-flop 92.

The I/O SEL line 27 also connects to an AND gate 99 and an AND gate 100. The second input on AND gate 99 connects to receive two microsecond clock pulses and its output connects to the clock terminal on a 4-bit shift register 101. The first output 102 on the shift register 101 connects to a second input on the OR gate 97 and its fourth output 103 connects to both the clock terminal 104 of a 4-bit binary counter 105 and to the input 106 of the 4-bit shift register 101. The output of OR gate 97 connects to a second input on AND gate 100 and its output connects to the inputs of two inverter gates 107 and 108. The output of inverter gate 107 connects to the RLE control line 35 and the output of inverter gate 108 connects through a READY line 109 to a terminal on the clock generator and driver circuit 68.

When the I/O SEL line 27 goes high, AND gates 99 and 100 are enabled. Clock pulses are thus applied to the 4-bit shift register 101 and a "zero" is shifted from the first output 102. Output 102 thus goes to a logic high voltage which is coupled through the OR gate 97 and the enabled AND gate 100 to the inverter gates 107 and 108. The RLE line 35 and the READY line 109 are thus driven low and remain low for a period of eight microseconds. At the end of eight microseconds, the "zero" at the fourth output 103 is clocked into the input 106 of the shift register 101 and reappears at the first output 102.

The 8-microsecond delay generated by the shift register 101 accomplishes two purposes. First, it holds the microprocessor 40 by disabling the clock generator and driver 68 to allow the I/O address and I/O data to propagate to and from the I/O interface racks 20-23. It also disables the I/O data gates 33 while the I/O address and I/O data is propagating.

If an I/O fault is detected during the 8-microsecond delay, a logic high is coupled through the OR gate 97 from the flip-flop 92 and the READY line 109 is not released after the 8 microsecond time period. The microprocessor 40 does not, therefore, execute the next machine cycle and the I/O SEL line 27 remains in its logic high state. As a consequence, the 4-bit shift register 101 continues to cycle and after each 8-microsecond cycle thereof, a count is added to the 4-bit binary counter 105. If the I/O fault persists for more than 128 microseconds (i.e. 16 counts), a logic high voltage is generated at a counter output terminal 110 to a NOR gate 111. As a result, a logic low voltage is generated on the I/O RESET line 17 and the operating devices connected to the I/O interface racks 20-23 are decontrolled. If the I/O fault clears before the counter 105 reaches the count of 16, the READY line 109 is released and the microprocessor 40 commences execution of the next machine cycle. As a result, the I/O SEL line 27 drops to a logic low voltage and the counter 105 is reset to zero through its reset terminal 112.

An I/O fault on the line 19 thus not only holds the microprocessor 40 and prevents it from executing further machine instructions, but it also will decontrol all of the operating devices connected to the programmable controller if it persists for a preselected time period.

Referring particularly to FIG. 3B, a watchdog timer comprised of a 40 millisecond multivibrator 115 and an RS-type flip-flop 116 provide a means for indicating faults which may occur in the controller processor 2. The input of the multivibrator 115 connects to the NSPC control line 72 and its Q output 117 connects to the S input on flip-flop 116. The R input of flip-flop 116 connects through a reset switch 118 to a positive DC supply terminal 119 and its Q output 120 connects to a second input on NOR gate 111. The $\overline{Q}$ output 121 on flip-flop 116 connects through a resistor 122 and light-emitting diode 123 to a positive DC supply terminal 124.

As indicated above, during normal operation of the controller processor 2, the NSPC control line 72 changes logic state at least once every 20 milliseconds when the I/O scan routine is executed. As will be described in detail hereinafter, fault detection means are provided within the controller processor 2 for inhibiting the execution of the I/O scan routine when a fault occurs. As a result, the NSPC control line 72 does not change state and the multivibrator times out and generates a logic high voltage at its Q output 117. This sets the flip-flop 116 to energize the light emitting doide 123 and to drive the I/O reset line 17 to a logic low voltage. A controller processor fault is thus indicated and the output devices connected to the programmable controller are decontrolled. The system is reset by depressing the pushbutton switch 118.

Figure 4:
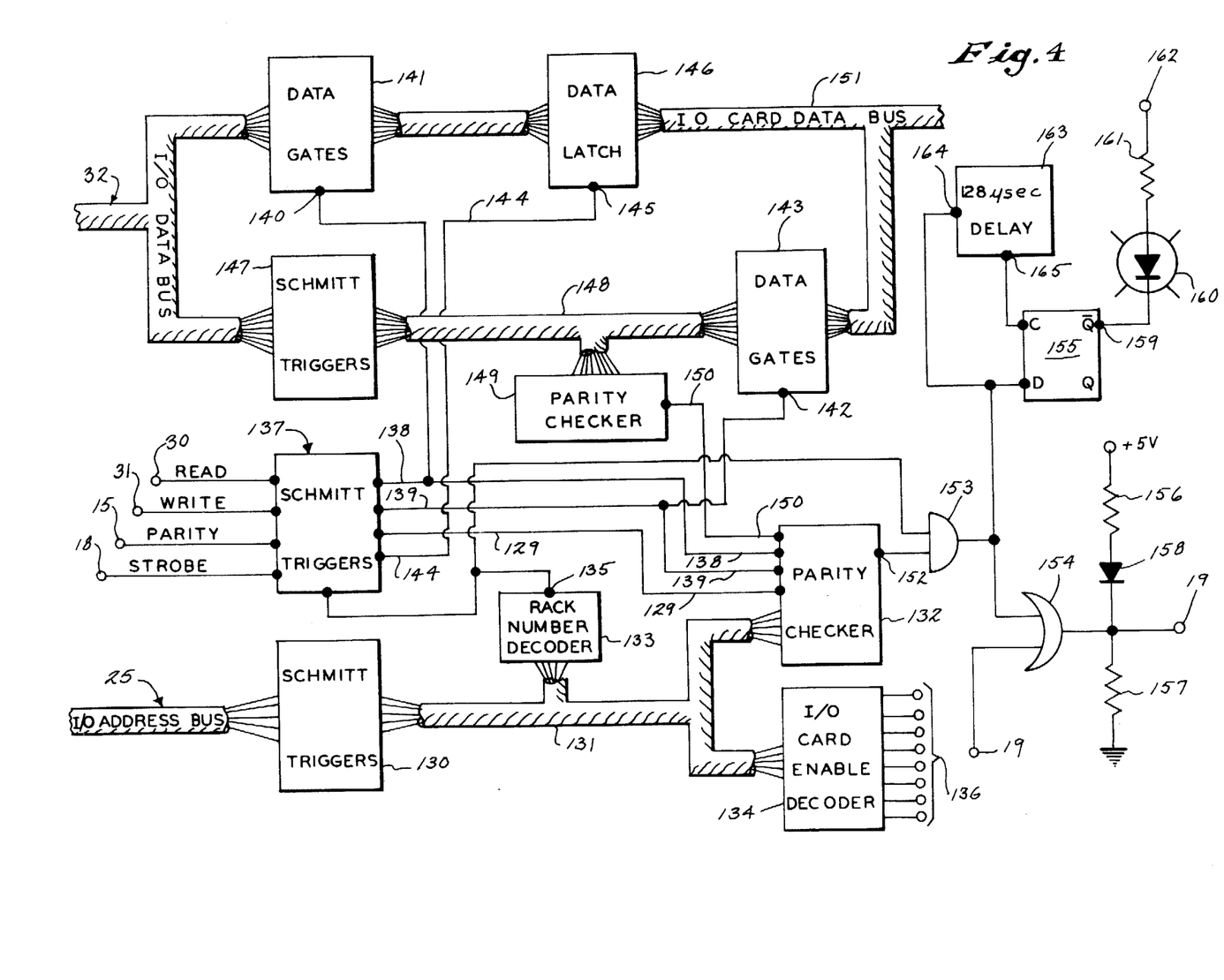
FIG. 4 is an electrical schematic diagram of an adaptor circuit which forms part of the programmable controller of FIG. 1.

Referring particularly to FIG. 4, the I/O adaptor circuits 24 on each I/O interface rack 20-23 includes substantial fault detection hardware. The five leads in the I/O address bus 25 connect to the inputs of five Schmitt triggers 130 which serve as noise filters. The five outputs of the Schmitt triggers 130 connect through a bus 131 to five inputs on a 9-bit parity checker 132, two outputs connect through the bus 131 to a 2-bit rack number decoder 133, and three outputs connect through the bus 131 to a 3-bit I/O card enable decoder 134. The rack number decoder 133 generates a logic high voltage at its output 135 when the number (0-3) of the I/O interface rack of which the I/O adaptor card 24 is a part is generated on the I/O address bus 25. The I/O card enable decoder 134 is a 4-line-to-10-line decoder which generates a logic high voltage on one of eight outputs 136 in response to the 3-bit binary code applied to its inputs. Each output line 136 connects to an I/O card in the same I/O interface rack and one of these eight cards is enabled each time an I/O address is generated on the bus 25.

A set of four Schmitt triggers 137 receive the signals on the READ line 30, the WRITE line 31, the parity line 15 and the STROBE line 18. The filtered READ and WRITE signals are generated on lines 138 and 139 respectively when the Schmitt triggers 137 are enabled by the rack number decoder 133. The READ line 138 connects to an input on the parity checker 132 and to an enable terminal 140 on a set of eight data gates 141. Similarly, the WRITE line 139 connects to an input on the parity checker 132 and to an enable terminal 142 on a set of eight data gates 143. The filtered parity signal on the line 15 is gated through the Schmitt triggers 137 to a control line 129 which connects to one input on the parity checker 132. The filtered STROBE signal is also gated through the Schmitt triggers 137 to a control line 144 which connects to a clock terminal 145 on an eight-bit data latch 146.

The eight leads in the I/O data bus 32 connect to the inputs of eight Schmitt triggers 147 and to the respective outputs of the data gates 141. The eight outputs of the Schmitt triggers 147 connect through a bus 148 to input terminals on the data gates 143 and to the inputs of an eight-bit parity checker 149. The output of the parity checker 149 connects through a lead 150 to the ninth input on the parity checker 132. The outputs of the eight data gates 143 connect to respective leads in an eight-bit I/O card data bus 151 and the same leads also connect to respective inputs on the data latch 146. The I/O card data bus 151 connects to each of the eight I/O cards in the I/O interface rack of which the adaptor circuit is a part.

Referring to FIGS. 1 and 4, when data is outputted to an I/O interface rack 20-23 the address of that interface rack (0-3) and the address of the particular I/O card (0-7) in that interface rack appear on the I/O address bus 25. The data appears on the I/O data bus 32 and the write line 31 is at a logic high voltage. The rack number decoder 133 in the addressed I/O interface rack generates a logic high at its output 135 which enables the Schmitt triggers 137 to couple the logic high on the write line 31 to the enable terminal 142 on the data gates 143. The addressed I/O card is enabled by the I/O card enable decoder 134 and the data on the bus 32 is coupled through the Schmitt triggers 147 and the data gates 143 to the enabled I/O card.

When data is inputted from an I/O interface rack 20-23, the address of that I/O interface rack and the address of the I/O card in that rack appear on the I/O address bus 25. A logic high appears on the read line 30 and is gated through the Schmitt triggers 137 in the address I/O interface rack to the enable terminal 140 on the data gates 141. The data from the addressed I/O card appears on the I/O card data bus 151 and is clocked into the data latch 146 by the signal on the strobe line 18. Eight bits of data are thus coupled through the data gates 141 onto the I/O data bus 32.

The parity checkers 149 and 132 monitor the I/O address, the I/O data and the READ and WRITE lines 30 and 31 to insure that accurate transmittal of data occurs. The logic state of the parity line 15 is such that the output terminal 152 of the parity checker 132 will be at a logic low level when the signals applied to its inputs and the inputs of the parity checker 149 are accurate. If an error occurs, the output 152 is driven high and this is gated through an AND gate 153 to one input of an OR gate 154 and to the D input of a D-type flip-flop 155. A second input on the OR gate 154 connects to the incoming I/O fault line 19 and its output terminal connects to the outgoing I/O fault line 19. A voltage divider comprised of a pair of resistors 156 and 157 and a diode 158 connect the output of OR gate 154 between signal ground and plus 5 volts.

When a fault is indicated at the output 152 of the parity checker 132, the output of OR gate 154 is pulled to a logic high voltage by the resistor 156 and diode 158 and a logic high fault condition is indicated on the outgoing I/O fault line 19. It should be apparent that this fault condition is propagated through other I/O adaptor cards 24 in the daisy chain by their OR gates 154. The logic high fault condition of the line 19 is thus eventually applied to the controller processor 2.

The source of an I/O fault is indicated by the flip-flop 155 which has its $\bar{Q}$ output 159 connected to a light emitting diode 160. The anode on the light emitting diode 160 connects through a resistor 161 to a positive DC supply terminal 162 and when the flip-flop 155 is set, the diode 160 is energized to provide a visual indication of the source of the I/O fault. A monostable multivibrator 163 has its input 164 connected to the output of AND gate 153 and its output 165 connects to the C input of the flip-flop 155. The multivibrator 163 provides a 128 microsecond delay to a logic high voltage applied to its input 164, and it thus serves to insure that the detected I/O fault is present for at least 128 microseconds before the flip-flop 155 is set to indicate a fault.

As indicated by the above description, faults are detected in the I/O interface racks 20-23 by hardware specifically dedicated to that function. In contrast, the operation of the controller processor 2 is periodically monitored by executing special routines which are stored in the ROM 42. If a fault is detected, it is indicated by allowing the watchdog timer (multivibrator 115 in FIG. 3B) to time out. Referring particularly to FIG. 2, these special routines include a test routine 170 and a hardware fault routine 171 which are stored after the I/O scan routine in the ROM 42. Before discussing these routines in detail, however, a brief discussion of the programmable controller instruction set and the manner in which the controller processor 2 executes this instruction set will be made. Reference is made to the above-cited copending patent application entitled "Programmable Controller with Integral Microprocessor" for a more detailed explanation.

Although the microprocessor 40 functions in response to machine language instructions stored in the ROM 42, the overall function of the programmable controller is governed by the programmable controller type instructions stored in the control program portion 10 of the RAM 4. These programmable controller type instructions are treated as "macro-instructions" in the programmable controller in that they are decoded by a macro-instruction decoder routine 175 and mapping table 176 and executed by a series of microprocessor machine instructions. The macro-instruction set includes three general types: bit instructions; word instructions; and control instructions. Bit instructions and word instructions are stored on two memory lines, the first line storing an operation code and the second line storing an operand address. The control instructions are comprised solely of a two-line operation code. The bit instructions include the following:

Table I

| MNEMONIC | BIT POINTER | | | OPERATION CODE | EXECUTION TIME |
|---|---|---|---|---|---|
| XIC/XOE | X | X | X | 0 1 0 1 1 | |
| XIO/XOD | X | X | X | 1 1 0 1 1 | 12.5 usec. |
| OTU | X | X | X | 1 0 1 1 1 | |
| OTL | X | X | X | 0 0 1 1 1 | |
| OTD | X | X | X | 1 1 1 1 1 | 16.5 usec. |
| OTE | X | X | X | 0 1 1 1 1 | |
| INSTRUCTION BIT NUMBER | 0 | 1 | 2 | 3 4 5 6 7 | |

The operations performed by these bit instructions are briefly defined as follows:

XIC — Examine status bit closed or, is the status bit in a logic 1 state?

XOE — Same as XIC, but refers to a status bit in the output image table.

XIO — Examine status bit open or, is the status bit in a logic 0 state?

XOD — Same as XIO, but refers to a status bit in the output image table.

OTU — If conditions are true turn status bit off, or to a logic 0 state, and if false do nothing.

OTL — If conditions are true turn status bit on, or to a logic 1 state, and if false do nothing.

OTD — If conditions are true turn status bit off and if conditions are false turn status bit on.

OTE — If conditions are true turn status bit on and if conditions are false turn status bit off.

The operand address which is associated with each of the above operation codes identifies the memory address of the word containing the desired status bit whereas the bit pointer associated with the operation code identifies the location of the status bit in the addressed memory word.

The control instructions include the following:

Table II

| MNEMONIC | OPERATION CODE | EXECUTION TIME |
|---|---|---|
| NOP | X 0 0 0 0 0 0 0 | |
| BND | X X X 0 0 0 1 1 | |
| BST | X X X 1 0 0 1 1 | 8.5 usec. |
| MCR | X X X 1 1 1 0 1 | |
| END | 0 0 1 0 0 1 0 0 | ≈ 100 usec. |
| INSTRUCTION BIT NUMBER | 0 1 2 3 4 5 6 7 | |

Note: X signifies "don't care"

The operations performed by these control instructions are briefly defined as follows:

NOP — No operation

BND — Branch end: termination of a Boolean sub-branch

BST — Branch start: opens or begins a Boolean sub-branch

END — End of the control program

MCR — Operate master control flip-flop

The word type programmable controller instructions include the following:

Table III

| MNEMONIC | OPERATION CODE | EXECUTION TIME |
|---|---|---|
| TOF 0.1 sec. | 0 0 0 1 0 0 0 0 | |
| TOF 1.0 sec. | 0 1 0 1 0 0 0 0 | |
| TON 0.1 sec. | 0 0 1 1 0 0 0 0 | ≈ 100 usec. |
| TON 1.0 sec. | 0 1 1 1 0 0 0 0 | |
| RTO 0.1 sec. | 0 0 0 0 1 0 0 0 | |
| RTO 1.0 sec. | 0 1 0 0 1 0 0 0 | |
| CTD | 0 1 1 0 1 0 0 0 | |
| CTU | 0 0 1 0 1 0 0 0 | |
| RTR | 0 1 0 0 0 1 0 0 | ≈ 100 usec. |
| CTR | 0 0 0 0 0 1 0 0 | |
| PUT | 0 1 0 1 1 0 0 0 | |
| GET | 0 0 0 1 1 0 0 0 | |
| EQU | 0 0 1 1 1 0 0 0 | ≈ 100 usec. |
| LES | 0 1 1 1 1 0 0 0 | |
| INSTRUCTION BIT NUMBER | 0 1 2 3 4 5 6 7 | |

The operations performed by these word-type instructions are briefly defined as follows:

TOF — If conditions are true turn output on, otherwise wait until time is out then turn output off.

TON — If conditions are true wait until time is out then turn output on, otherwise, turn output off.

RTO — If conditions are true wait until time is out then turn output on, otherwise, stop timer.

CTD — If the conditions are true reduce the count by one.

CTU — If the conditions are true increase the count by one.

PUT — If conditions are true write the number in the microprocessor accumulator in the selected memory line, otherwise, do nothing.

RTR — If the conditions are true reset the timer.

CTR — If the conditions are true reset the counter.

GET — Fetch the word on the selected memory line and store in the microprocessor accumulator.

EQU — Is the value stored in the microprocessor accumulator equal to the value stored on the selected memory line?

LES — Is the value stored in the microprocessor accumulator less than the value stored on the selected memory line?

The operand address which is associated with each of these word-type operation codes is an eight-bit address, which, when combined with the 8K constant, is a memory address of a line in the RAM 4.

The programmable controller type instructions are executed by the combined operation of the microprocessor 40 and the Boolean processor 41. With some of the word-type controller instructions such as GET, EQU, and LES, the microprocessor 40 performs virtually all of the indicated operations in combination with the RAM 4. On the other hand, with the control type instructions such as BST, BND and MCR, the microprocessor 40 serves only to read the operation code from the RAM 4 and properly enable the Boolean processor 41. The Boolean processor 41 actually performs the indicated operation. With most programmable controller type instructions, however, the operations indicated by the instruction are performed in part by the microprocessor 40 and in part by the Boolean processor.

Referring particularly to FIG. 2, the Boolean processor 41 is connected to the processor data bus 43 to receive data directly from the microprocessor 40, and is connected to the data bus 1 to both receive data from the RAM 4 and to generate data to both the RAM 4 and the microprocessor 40. The operation of the Boolean processor 41 is controlled through the lines which connect it to the timing and control circuit 45 (i.e., WO 29, DBIN 51, STACK 70, STATUS IN 71, and NSPC 72). In addition, the Boolean processor 41 is responsive to the operation codes in programmable controller type instructions which are received directly from the RAM 4 or indirectly through the microprocessor 40.

As described in the above cited copending application entitled "Programmable Controller with Integral Microprocessor," the Boolean processor 41 includes a logic unit having a set of four flip-flops (not shown in the drawings) which are employed to solve Boolean expressions defined by programmable controller type instructions. As a Boolean expression is executed, the status of these flip-flops change in a prescribed manner. At the completion of the controller instructions which comprise the Boolean expression, the state of one of these flip-flops is the solution which is read out of the Boolean processor 41 and written into the RAM 4.

The test routine stored in the ROM 42 is comprised of a set of programmable controller instructions which direct the Boolean processor through a prescribed series of steps which involve all of its flip-flops. A special macroinstruction called TEST 1 is then executed to read the state of the four Boolean flip-flops into the microprocessor 40 as a status word. This status word is compared with a reference status word which is stored in the ROM 42. If the Boolean processor and associated control lines are operating properly, the actual status word and the reference status word are identical and no fault is indicated.

| Test Routine | |
|---|---|
| XIC | ≈ 100 (06) |
| BST | |
| XIO | ≈ 100 (07) |
| BST | |
| XIC | ≈ 100 (03) |
| TEST 1 | |

| Test 1 Macroinstruction Execution Routine | |
|---|---|
| ANA | E |
| CPI | MSK1 |
| JZ | MAIN |

If the Boolean processor 41 is operating properly the next controller type instruction is executed. If not, the jump to main does not occur and the hardware fault routine 171 which follows is executed. In essence, the hardware fault routine 171 establishes a loop in which an error message is outputted to a CRT screen on a program panel (not shown in the drawings) and the program panel is examined to ascertain if a character has been inputted by the operator. The system remains in this loop and after 40 milliseconds the watchdog timer multivibrator 115 (FIG. 3B) times out to decontrol all operating devices connected to the programmable controller and to energize the processor fault indicator LED 123.

| Hardware Fault Routine | | |
|---|---|---|
| Label | Instruction | |
| | MVI | A,15H |
| | OUT | PCIST |
| TRDY | IN | PCIST |
| | ANI | 01H |
| | JZ | TRDY |
| | MVI | A,15H |
| | OUT | PCIDT |
| | JMP | TRDY |

It should be apparent to those skilled in the art that other routines can be developed for testing the operation of various programmable controller elements. As disclosed in copending U.S. patent application Ser. No. 779,916 entitled "Malfunction Detection System for a Programmable Controller" the basic idea is to operate the controller elements in a prescribed manner and then test their state to ascertain whether they are in the expected state. If such test fails indicating that a malfunction has occurred, the system jumps to the above described hardware fault routine 171.

We claim:

1. In a programmable controller having a controller processor which connects to a plurality of separate I/O interface racks through an I/O address bus and an I/O data bus, the improvement therein comprising:
   means at each of said I/O interface racks for detecting a malfunction condition thereat and generating a fault indicating logic signal when such a malfunction condition is detected;
   a logic gate at each of said I/O interface racks having one input connected to receive said fault indicating logic signal, a second input and an output;
   an I/O fault line which connects in daisy chain fashion between said I/O interface racks and to said controller processor, said I/O fault line connecting the output of the logic gate in each of said I/O interface racks with the second input of the logic gate in the next I/O interface rack in the daisy chain and connecting the output of the logic gate in the last I/O interface rack in the daisy chain to the controller processor; and
   means at said controller processor for receiving said fault indicating logic signal on said I/O fault line and indicating the presence of a malfunction.

2. The improvement as recited in claim 1 in which said means at said controller processor includes means for inhibiting the controller processor from executing programmable controller instructions when said fault indicating logic signal is present on said I/O fault line.

3. The improvement as recited in claim 1 in which said means at said controller processor includes timing means which is enabled when said fault indicating logic signal is present on said I/O fault line and which generates a reset signal at an output thereon when said fault indicating logic signal is present for a preselected time interval, and an I/O reset line connects to the output of said timing means and to each of said I/O interface racks to couple said reset signal thereto.

4. The improvement as recited in claim 3 in which watchdog timer means at said controller processor is coupled to said I/O reset line and is coupled to monitor the occurrence of a periodic event within said controller processor, said watchdog timer means being operable to generate a reset signal on said I/O reset line when said monitored periodic event does not occur within a preselected time interval.

5. The improvement as recited in claim 4 in which said controller processor includes: a microprocessor which executes instructions stored in a memory; a Boolean processor which is responsive to control signals from said microprocessor to perform logical operations on data stored within said memory; and a set of instructions stored in said memory which are periodically executed by said microprocessor and which direct the Boolean processor to execute a prescribed sequence of operations, which compare the actual state of said Boolean processor with a predetermined state after the execution of the prescribed sequence of operations and which inhibit the occurrence of said monitored event when the actual state of said Boolean processor is not the same as said predetermined state.

6. A programmable controller comprising:
a memory which stores instructions;
a microprocessor connected to said memory, said microprocessor being operable to read instructions out of said memory and execute them;
a Boolean processor coupled to said memory and said microprocessor, said Boolean processor being operable in response to control signals from said microprocessor to perform logical operations on data stored within said memory;
malfunction indicating means which includes a watchdog timer coupled to said microprocessor to detect the occurrence of a preselected periodic event, said malfunction indicating means being operable to indicate a malfunction when said preselected periodic event does not occur within a preselected time period as determined by the timing out of said watchdog timer; and
wherein the instructions stored in said memory include a set of instructions which are periodically executed by said microprocessor while said programmable controller is on line to test the operation of said Boolean processor, said set of instructions including:
a first subset of instructions which direct the Boolean processor to execute a prescribed sequence of operations;
a second subset of instructions which compare the actual state of said Boolean processor with a predetermined state after the execution of said first subset; and
a third subset of instructions which enable said indicating means when the actual state of said Boolean processor is not the same as said predetermined state by inhibiting the occurrence of said preselected periodic event.

7. The improvement as recited in claim 6 in which said indicating means is coupled to an I/O reset line which connects to an I/O interface rack that couples the programmable controller to operating devices on a machine being controlled, and in which a reset signal is generated on said I/O reset line when said watchdog timer times out to decontrol the operating devices coupled to said I/O interface rack.

8. The improvement as recited in claim 6 in which a visual indicator is coupled to said watchdog timer for energization thereby when the watchdog timer times out.

* * * * *